(12) United States Patent
Solek et al.

(10) Patent No.: US 10,928,494 B1
(45) Date of Patent: Feb. 23, 2021

(54) ULTRASOUND PLURAL DISPLAY APPARATUS WITH LIGHT INDICATOR FOR POSITIONAL ACCESS

(71) Applicant: Interson Corporation, Pleasanton, CA (US)

(72) Inventors: Roman Solek, Pleasanton, CA (US); Albert Lee, Fremont, CA (US); David Asarnow, Albany, CA (US)

( * ) Notice: Subject to any disclaimer, the term of this patent is extended or adjusted under 35 U.S.C. 154(b) by 335 days.

(21) Appl. No.: 16/029,027

(22) Filed: Jul. 6, 2018

Related U.S. Application Data

(60) Provisional application No. 62/530,688, filed on Jul. 10, 2017.

(51) Int. Cl.
*G01S 7/52* (2006.01)
*G01S 15/89* (2006.01)

(52) U.S. Cl.
CPC ...... *G01S 7/52053* (2013.01); *G01S 7/52044* (2013.01); *G01S 15/8925* (2013.01)

(58) Field of Classification Search
CPC ............. G01S 7/52053; G01S 15/8925; G01S 7/52044
See application file for complete search history.

(56) References Cited

U.S. PATENT DOCUMENTS

| | | | | |
|---|---|---|---|---|
| 5,944,666 A | * | 8/1999 | Hossack | A61B 8/06 600/454 |
| 5,947,904 A | * | 9/1999 | Hossack | A61B 8/06 600/458 |
| 6,142,946 A | * | 11/2000 | Hwang | G01S 7/52017 600/459 |
| 8,939,908 B2 | * | 1/2015 | Suzuki | A61B 8/54 600/437 |
| 9,089,306 B2 | * | 7/2015 | Harada | A61B 8/4483 |
| 10,206,657 B2 | * | 2/2019 | Meier | A61B 8/54 |
| 2003/0149366 A1 | * | 8/2003 | Stringer | A61B 8/42 600/464 |
| 2013/0338506 A1 | * | 12/2013 | Kim | G01S 7/52095 600/447 |
| 2014/0031693 A1 | * | 1/2014 | Solek | B06B 1/0215 600/447 |

(Continued)

FOREIGN PATENT DOCUMENTS

WO WO-2017205415 A1 * 11/2017 ........... B06B 1/0622

*Primary Examiner* — Daniel Pihulic
(74) *Attorney, Agent, or Firm* — Gerald R. Prettyman

(57) ABSTRACT

Disclosed is a single ultrasound imaging probe 101 comprising a single ultrasound transducer array 103 comprising a first array segment 201 comprising a K plurality of ultrasound transducer elements 103*a* and an orthogonally arranged second array segment 202 comprising an M plurality of ultrasound transducer elements 103*b* such that the first array segment 201 and the second array segment 202 comprise a K plurality of ultrasound transducer elements 103*a* plus an M plurality of ultrasound transducer elements 103*b* which are electrically connected to provide for the simultaneous display of a scan-converted transverse view ultrasound image and of a scan-converted longitudinal view ultrasound image in a video display 406 of a target scan region for three-dimensional alignment, guided by a projected light beam, of an exterior device in order to access an interior structure below the exterior target region.

8 Claims, 7 Drawing Sheets

(56) References Cited

U.S. PATENT DOCUMENTS

| | | | |
|---|---|---|---|
| 2014/0031694 A1* | 1/2014 | Solek | A61B 8/461 600/459 |
| 2015/0230776 A1* | 8/2015 | Meier | A61B 8/4427 600/424 |
| 2017/0343655 A1* | 11/2017 | Solek | A61B 8/4444 |
| 2019/0197764 A1* | 6/2019 | Zheng | G06T 15/205 |
| 2020/0100766 A1* | 4/2020 | Solek | A61B 8/4494 |

* cited by examiner

ULTRASOUND PLURAL DISPLAY APPARATUS WITH LIGHT INDICATOR FOR POSITIONAL ACCESS

CROSS-REFERENCE TO RELATED APPLICATIONS

The application claims the benefit of priority to U.S. Provisional Patent Application No. 62/530,688, filed Jul. 10, 2017, titled "Bi-Planar Ultrasound Probe System with Orthogonally Oriented Scan Planes", which application is incorporated by reference in its entirety.

STATEMENT REGARDING FEDERALLY SPONSORED RESEARCH OR DEVELOPMENT

Not Applicable

BACKGROUND OF THE INVENTION

Field of Invention

The invention relates to ultrasound imaging probes, and more specifically, to ultrasound imaging probes which use a plurality of ultrasound transducer elements to enable simultaneous display of multiple scan planes.

Description of Related Art

Ultrasound imaging systems that scan in two planes use two separate arrays of transducer elements with each array controlled by a separate ultrasound circuitry. Operating two separate ultrasound circuitries simultaneously to transmit and receive ultrasonic echoes, processing the signals, and rendering the images, requires computationally intensive hardware, and generally requires a specialized and proprietary ultrasound system. The size and complexity of these systems deter use in small facilities as well as in mobile and other confined environments, where despite the limitations, first responders and other treatment professionals may need ultrasound guidance to improve the speed and quality of field treatment.

SUMMARY OF THE INVENTION

Disclosed are structures and a process for displaying a transverse image from a K plurality of ultrasound transducer elements with a longitudinal image from an M plurality of ultrasound transducer elements wherein the K plurality of ultrasound transducer elements are orthogonal to the M plurality of ultrasound transducer elements and the K plurality of ultrasound transducer elements are within the same ultrasound transducer array as the M plurality of ultrasound transducer elements.

Disclosed is a single ultrasound imaging probe 101 comprising a single ultrasound transducer array 103 comprising a first array segment 201 comprising a K plurality of ultrasound transducer elements 103a and an orthogonally arranged second array segment 202 comprising an M plurality of ultrasound transducer elements 103b such that the first array segment 201 and the second array segment 202 comprise a K plurality of ultrasound transducer elements 103a plus an M plurality of ultrasound transducer elements 103b which are electronically coupled to provide for the simultaneous display of a scan-converted transverse view ultrasound video image and of a scan-converted longitudinal view ultrasound video image in a video display 406 of a target scan region for three-dimensional alignment of an exterior device in order to access an interior structure below the exterior target region.

Also disclosed is a light source to project a visible beam of light to indicate a vertical midline of the transverse scan plane.

Also disclosed is the light source as a light-emitting diode or as a diode laser.

Also disclosed is the single ultrasound transducer array 103 as fully integrated with control electronics within an enclosure as a single ultrasound imaging probe 101 that directly interfaces with a variety of signal processing and display devices.

DETAILED DESCRIPTION OF THE INVENTION

Figure 1:
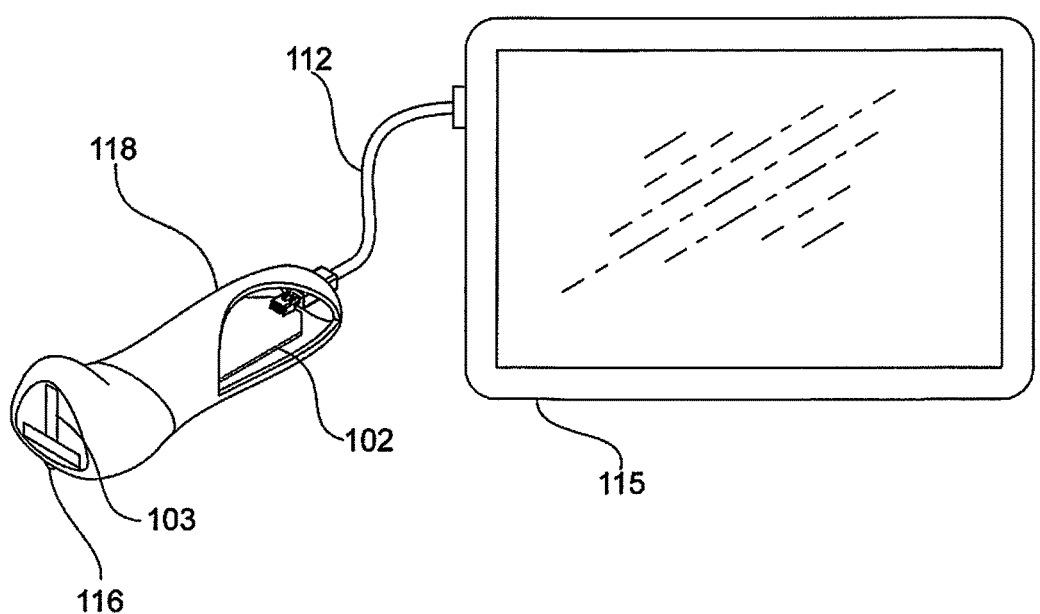
FIG. 1 shows an overview of an ultrasound imaging probe to facilitate a simultaneous display of a transverse view and of a longitudinal view of a target scan region for three-dimensional alignment of an exterior device in order to access an interior structure below the exterior target region.

FIG. 1 shows an overview of an ultrasound imaging probe to facilitate a simultaneous display of a transverse view and of a longitudinal view of a target scan region for three-dimensional alignment of an exterior device in order to access an interior structure below the exterior target region.

Shown in FIG. 1 are an exterior housing 118 comprising at least one electronics circuitry for processing ultrasound echo signals 102, a K plus M plurality of transducer elements in a single T-shaped ultrasound transducer array 103, a light source 116, a passive interface 112 and a display processing and display system 115.

The exterior housing 118 may be made in any shape and of any material suitable for containing the at least one electronics circuitry for processing ultrasound echo signals 102, a K plurality of ultrasound transducer elements 103a plus an M plurality of ultrasound transducer elements 103b in a single ultrasound transducer array 103, a light source 116, and is capable of connection to a passive interface 112 for connection to a processing and display system 115. The exterior housing 118 may be made of plastic but may also be made of other softer or harder materials. The exterior housing may have an ergonomic design.

The passive interface 112 between the single ultrasound imaging probe 101 and the display processing and display system 115 may be a USB cable. Other types of connections may be used, such as other wired systems. Wireless standardized communication protocols may be used, such as WIFI, Bluetooth, or Zigbee.

The display processing and display system 115 may be a host computer, such as a tablet computer, laptop computer, or desktop computer, or other system for display processing and displaying images.

Figure 2:
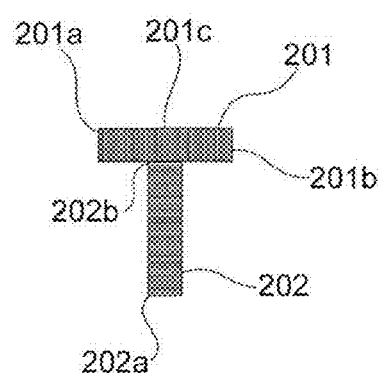
FIG. 2 shows a single ultrasound transducer array 103 segmented into two orthogonally arranged ultrasound transducer array segments (i.e., arranged in a "T" shape).

FIG. 2 shows a single ultrasound transducer array 103 of two orthogonally arranged ultrasound transducer array segments (i.e., arranged in a "T" shape).

The single ultrasound transducer array 103 comprises a first array segment 201 and a second array segment 202. As shown, the first array segment 201 comprises a first array segment first end 201a, a first array segment second end 201b and a first array segment midpoint 201c, while second array segment 202 comprises a second array segment first end 202a and a second array segment second end 202b.

Arranged in a T shape, ultrasound scans from the first array segment 201 are orthogonal to scans from the second array segment 202 and when scanned and read simultaneously, may be read as simultaneous displays of a transverse view and of a longitudinal view of a target region.

Typically, purported ultrasound systems to display simultaneous transverse and longitudinal views use two N-element arrays and multiple array controllers. Multiple array controllers may be avoided, however, by regarding the whole arrangement as a single array of 2N elements. A first computational scan converter 401 and a second computational scan converter 402 perform the scan conversion, which as the arrays are of fixed size, accounts for which element corresponds with which array.

The first array segment 201 and the second array segment 202 may have different numbers of elements. The first array segment 201 might have a K plurality of ultrasound transducer elements while the second array segment 202 could have an M plurality of ultrasound transducer elements. The complete array arrangement would thus have a K plurality of ultrasound transducer elements 103a plus an M plurality of ultrasound transducer elements 103b in a single ultrasound transducer array 103.

By regarding the second array segment 202 as a continuation of ultrasound transducer elements from the first array segment 201, it is possible, through proper sequencing, to produce real-time bi-planar images at no additional computational or power cost. As there is no additional circuitry required to control and keep track of two transducer arrays, all of the at least one electronics circuitry for processing ultrasound echo signals 102 can be completely integrated into the single ultrasound imaging probe 101 for interfacing with a computational scan converter system and a display system.

To achieve the computational operations, the first array segment 201 comprises a first array segment first end 201a, a first array segment second end 201b and a first array segment midpoint 201c, while the second array segment comprises second array segment first end 202a and a second array segment second end 202b, with the first array segment 201 orthogonally positioned to the second array segment 202 with the first array segment midpoint 201c adjacent to the second array segment second end 202b. This arrangement thus achieves the K plurality of ultrasound transducer elements 103a plus the M plurality of ultrasound transducer elements 103b in a single ultrasound transducer array 103 while facilitating a simultaneous display of a transverse view and of a longitudinal view without duplication of electronic circuitries.

Figure 3:
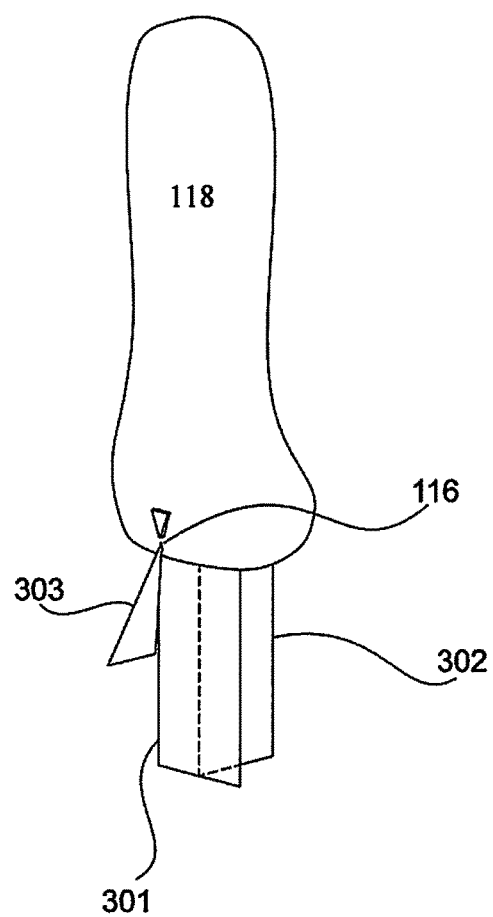
FIG. 3 shows two orthogonal scan planes (i.e., arranged in a "T" shape) produced by a single ultrasound imaging probe 101 which uses a single ultrasound transducer array 103 segmented into two orthogonally arranged transducer segments (i.e., arranged in a "T" shape), with a light beam projected co-linear to one plane of one of the segments.

FIG. 3 shows two orthogonal scan planes (i.e., arranged in a "T" shape) produced by a single ultrasound imaging probe 101 which uses a single ultrasound transducer array 103 of two orthogonally arranged transducer segments (i.e., arranged in a "T" shape), with a visible beam of light projected co-linear to one ultrasound plane of one of the segments.

Shown in FIG. 3 are an exterior housing 118 with the K plurality of ultrasound transducer elements 103a plus an M plurality of ultrasound transducer elements 103b in a single ultrasound transducer array 103 (not shown) emitting ultrasound signals to produce a first array segment ultrasound plane 301 and a second array segment ultrasound plane 302. Also disclosed in FIG. 3 is a light source 116 and a visible beam of light 303 emitted by the light source 116 with the visible beam of light 303 coplanar to the second array segment ultrasound plane 302.

As shown in FIG. 3, the first array segment ultrasound plane 301 and the second array segment ultrasound plane 302 project downward (in this view) from the exterior housing 118. If the first array segment ultrasound plane 301 and the second array segment ultrasound plane 302 were actually visible to the viewer (as shown in FIG. 3), the first array segment ultrasound plane 301 projects in this view somewhat across of the width (i.e., left and right) of the view, while the second array segment ultrasound plane 302 projects orthogonally to the first array segment ultrasound plane 301. Note also that the midline of the first array segment ultrasound plane 301 is adjacent to a proximal end of the second array segment ultrasound plane 302. This arrangement places the first array segment ultrasound plane 301 as the upper horizontal line of a capital T, with the second array segment ultrasound plane 302 as the vertical line of a capital T, hence the term, T shaped arranged ultrasound planes.

When used, these T shaped arranged ultrasound planes provide simultaneous longitudinal views and transverse views of the target region. The T shaped arranged ultrasound planes may be particularly useful in medical applications for the accurate placement of a device such as a peripherally inserted central catheter (PICC) line. A transverse view can show the precise orientation and placement of a needle with respect to a target vein. Conversely, a longitudinal view can show the depth of insertion of a needle. An ultrasound probe which can image in two orthogonal planes enables the simultaneous visualization of the transverse and longitudinal views of the vein so that the needle placement and depth can be monitored in order to precisely target the interior space of the vein without going too far and piercing the opposite wall of the vein.

As shown in FIG. 3, the light source 116 emits a visible beam of light 303 that bisects the first array segment ultrasound plane 301 and is coplanar to second array segment ultrasound plane 302. The visible beam of light 303 thus creates a central reference line on an exterior target region to provide alignment of an exterior device in order to access an interior structure below the exterior target region. When used, for example, for PICC placement, the visible beam of light 303 projects onto a patient's skin to indicate the midline of the transverse scan plane, and provides assurance of correct orientation of a needle towards the target vessel.

Figure 4:
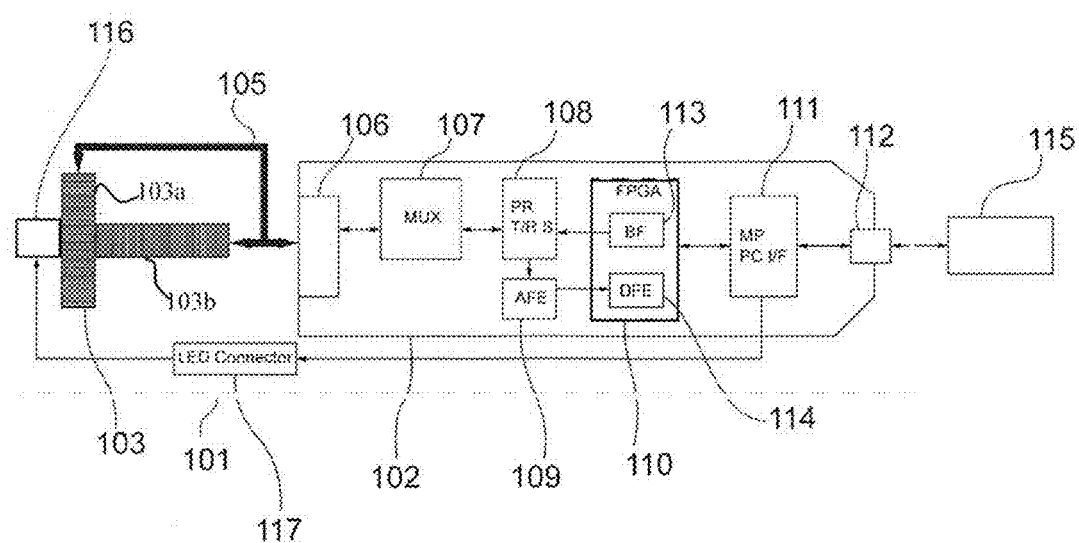
FIG. 4 shows a high-level block diagram of the imaging system.

FIG. 4 shows a high-level block diagram of the imaging system. Shown in FIG. 4 are a single ultrasound imaging probe 101, at least one electronics circuitry for processing ultrasound echo signals 102, a K plurality of ultrasound transducer elements 103a plus an M plurality of ultrasound transducer elements 103b in a single ultrasound transducer array 103, an electric connection 105, a connector 106, a multiplexer 107, a pulser-transmit/receive switch 108, an analog front end 109, a field-programmable gate array 110, a microprocessor 111, a passive interface 112, a beam forming module 113, a digital front end 114, a display processing and display system 115, a light source 116 and a light source connector 117.

The single ultrasound imaging probe 101 may contain all the above components except the display processing and display system 115.

The at least one electronics circuitry for processing ultrasound echo signals 102 secures the electronic components and electronic connections to each other and within the exterior housing 118 of the single ultrasound imaging probe 101. The at least one electronic circuitry for processing ultrasound echo signals 102 controls the transmit, receive, beam forming, and focusing functions.

The K plurality of ultrasound transducer elements 103a plus the M plurality of ultrasound transducer elements 103b in a single ultrasound transducer array 103 transmit ultrasound signals and read returning ultrasound echoes and convert ultrasound echoes into ultrasound data lines.

The electric connection 105 electrically connects the K plurality of ultrasound transducer elements 103a plus the M plurality of ultrasound transducer elements 103b in a single ultrasound transducer array 103 to a connector 106 of the at least one electronics circuitry for processing ultrasound echo signals 102 to convey transmit signals to the appropriate ultrasound transducer elements of the K plurality of ultrasound transducer elements 103a plus the M plurality of ultrasound transducer elements 103b in a single ultrasound transducer array 103, and conveys ultrasound echo signals from the K plurality of ultrasound transducer elements 103a plus the M plurality of ultrasound transducer elements 103b in a single ultrasound transducer array 103 to the at least one electronics circuitry for processing ultrasound echo signals 102.

The multiplexer 107 controls which elements of the arrays are currently active for transmitting or receiving and the pulser-transmit/receive switch 108 allows the active elements to switch between transmit and receive functions.

The field-programmable gate array 110 handles the beam forming functions in a beam forming module 113 and digital signal processing in a digital front end 114. The received ultrasound echoes are processed and digitized by the analog front end 109 which sends the digital signal to the field-programmable gate array 110 for digital signal processing.

The microprocessor 111 interfaces with outside systems such as the scan converter system (FIG. 5) and the display processing and display system 115 through a passive interface 112 such as, but not limited to, a universal serial bus (USB). Microprocessor 111 also controls the light source 116 through a light source connector 117.

The passive interface 112 connects the at least one electronics circuitry for processing ultrasound echo signals 102 to the scan converter system (FIG. 5) and the display processing and display system 115 for display of a transverse image and a longitudinal image from the ultrasound echo signals of the K plurality of ultrasound transducer elements 103a plus the M plurality of ultrasound transducer elements 103b in a single ultrasound transducer array 103.

The display processing and display system 115 receives scan converted signals from the scan converter system (FIG. 5), processes the signals for display, and delivers the signals to the display components for display of the transverse image and the longitudinal image.

The light source 116 may be affixed externally to the exterior housing 118 of the single ultrasound imaging probe 101. The light source 116, projects a visible beam of light 303 onto an exterior target region (not shown) and is centrally aligned with the K plurality of ultrasound transducer elements 103a plus the M plurality of ultrasound transducer elements 103b in a single ultrasound transducer array 103 (i.e., coplanar to the second array segment ultrasound plane 302) to aid visualization for center alignment of an exterior device in order to access an interior structure below the exterior target region. The light source 116 may be a light emitting diode or may be a laser diode. Microprocessor 111 controls the light source 116 through a light source connector 117.

Figure 5:
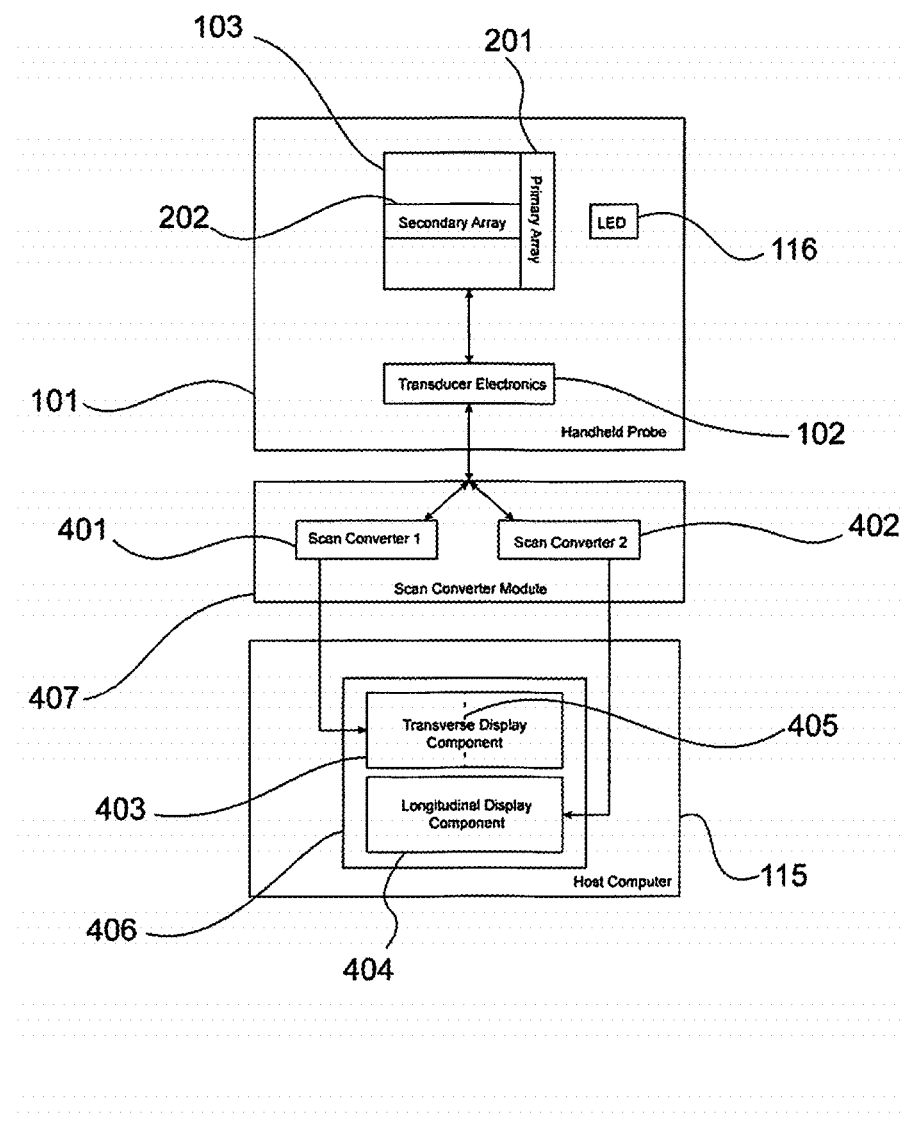
FIG. 5 shows a modular view of a system using a K plurality of ultrasound transducer elements plus an M plurality of ultrasound transducer elements orthogonally arranged to transmit and read ultrasound signals for creating a transverse image from the K plurality of ultrasound transducer elements and a longitudinal image from the M plurality of ultrasound transducer elements to facilitate a simultaneous display of a transverse view and of a longitudinal view of a target scan region for three-dimensional alignment of an exterior device in order to access an interior structure below the exterior target region.

FIG. 5 shows a modular view of a system using a K plurality of ultrasound transducer elements plus an M plurality of ultrasound transducer elements orthogonally arranged to transmit and read ultrasound signals for creating a transverse image from the K plurality of ultrasound transducer elements and a longitudinal image from the M plurality of ultrasound transducer elements to facilitate a display of simultaneous longitudinal views and transverse views of a target scan region for three-dimensional alignment of an exterior device in order to access an interior structure below the exterior target region.

Shown in FIG. 5 are the single ultrasound imaging probe 101, the at least one electronics circuitry for processing ultrasound echo signals 102, the K plurality of ultrasound transducer elements 103a plus the M plurality of ultrasound transducer elements 103b in a single ultrasound transducer array 103, the light source 116, the first array segment 201, the second array segment 202, a scan converter module 407 comprising a first computational scan converter 401 and a second computational scan converter 402, and a display processing and display system 115 comprising a first display area 403, a second display area 404, a vertical midline indicator 405, and a video display 406.

As previously disclosed, the single ultrasound imaging probe 101 contains the K plurality of ultrasound transducer elements 103a of the first array segment 201 plus the M plurality of ultrasound transducer elements 103b of the second array segment 202 in a single ultrasound transducer array 103, of which the at least one electronics circuitry for processing ultrasound echo signals 102 controls the transmission, receiving, beam forming, and focusing functions, as well as processing the ultrasound echo signals and sending electronic signals for conversion and ultimately display. The light source 116 is attached to the single ultrasound imaging probe 101 for displaying a centerline on an exterior target region to provide alignment of an exterior device in order to access an interior structure below the exterior target region.

As shown in FIG. 5, the scan converter module 407 comprises a first computational scan converter 401 and a second computational scan converter 402. Additional computational scan converters may be added for additional computational scan converter capacity.

The scan conversion system performs scan conversion, rendering, time gain compensation (TGC), and image processing, and provides additional features such as the ability to save images and videos or take measurements of the objects in the images.

The first computational scan converter 401 and the second computational scan converter 402 in the scan converter module 407 process the ultrasound echo scan line data. The first computational scan converter 401 processes a set of scan line data from the first array segment 201, producing a transverse ultrasound image for display in the first display area 403. The second computational scan converter 402 processes a set of scan line data from the second array segment 202, producing a longitudinal ultrasound image for display in the second display area 404. A vertical midline indicator 405 is overlaid on the transverse image on the first display area 403 to correspond with the orientation of the reference line projected by the light source 116.

The scan converter module 407 and the video display 406 may be discreet computational units or may be incorporated into a general purpose computer system.

Figure 6:
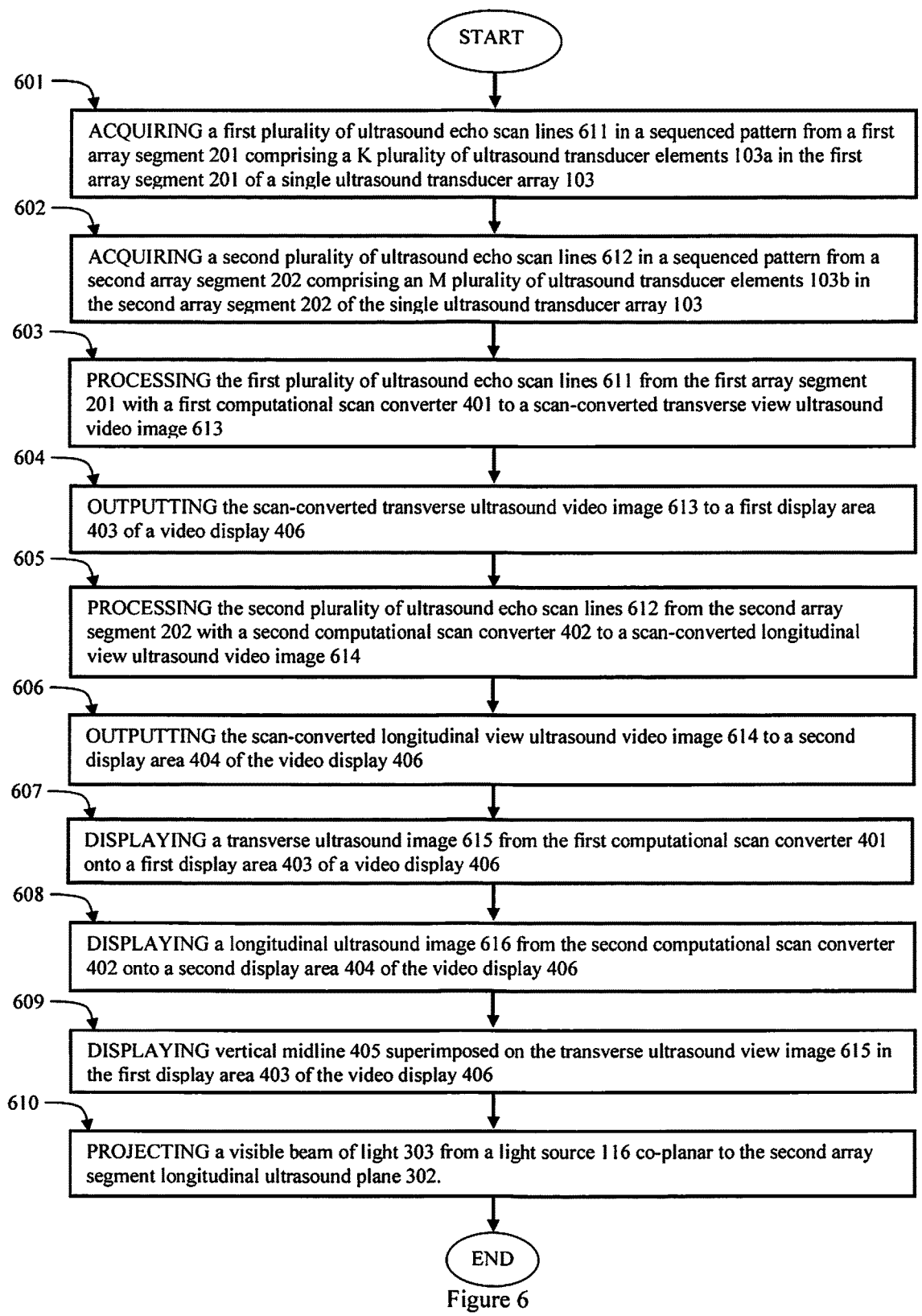
FIG. 6 shows a process for operating a single ultrasound imaging probe 101 using two orthogonally arranged transducer array segments to display a transverse image from a K plurality of ultrasound transducer elements with a longitudinal image from an M plurality of ultrasound transducer elements wherein the K plurality of ultrasound transducer elements are orthogonal to the M plurality of ultrasound transducer elements and the K plurality of ultrasound transducer elements part of the same ultrasound transducer array as the M plurality of ultrasound transducer elements.

FIG. 6 shows a process for operating a single ultrasound imaging probe 101 using two orthogonally arranged transducer array segments to display a transverse image from a K plurality of ultrasound transducer elements with a longitudinal image from an M plurality of ultrasound transducer elements wherein the K plurality of ultrasound transducer elements are orthogonal to the M plurality of ultrasound transducer elements and the K plurality of ultrasound transducer elements are part of the same ultrasound transducer array as the M plurality of ultrasound transducer elements.

In Step 601, acquiring a first plurality of ultrasound echo scan lines 611 from a first array segment ultrasound plane 301 of a first array segment 201 comprising a K plurality of ultrasound transducer elements 103 a in a first array segment 201 of a single ultrasound transducer array 103.

In Step 602, acquiring a second plurality of ultrasound echo scan lines 612 from a second array segment ultrasound plane 302 of a second array segment 202 comprising an M plurality of ultrasound transducer elements 103b in a second array segment 202 of the single ultrasound transducer array 103.

In Step 603, processing the first plurality of ultrasound echo scan lines 611 from the first array segment 201 with a first computational scan converter 401 to a scan-converted transverse view ultrasound video image 613.

In Step 604, outputting the scan-converted transverse view ultrasound video image 613.

In Step 605, processing the second plurality of ultrasound echo scan lines 612 from the second array segment 202 with a second computational scan converter 402 to a scan-converted longitudinal view ultrasound video image 614.

In Step 606, outputting the scan-converted longitudinal view ultrasound video image 614.

In Step 607, displaying the transverse view ultrasound video image 615 from the first computational scan converter 401 onto a first display area 403 of a video display 406.

In Step 608, displaying the longitudinal view ultrasound video image 616 from the second computational scan converter 402 onto a second display area 404 of the video display 406.

In Step 609, displaying a vertical midline indicator 405 superimposed on the transverse view ultrasound video image 615 in first display area 403 of the video display 406 such that the vertical midline indicator 405 represents a point of reference of the longitudinal view ultrasound video image 616.

In Step 610, projecting a visible beam of light 303 from a light source 116 co-planar to the second array segment ultrasound plane 302.

Figure 7:
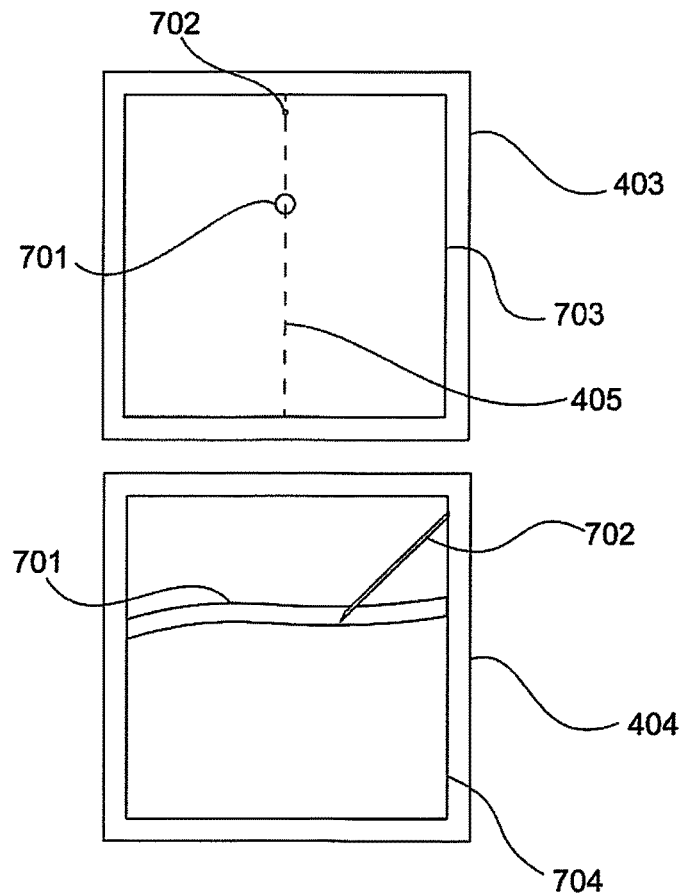
FIG. 7 shows a simultaneous display of transverse view and of a longitudinal view of a target scan region for three-dimensional alignment of an exterior device in order to access an interior structure below the exterior target region.

FIG. 7 shows a display of a simultaneous transverse view ultrasound video image 703 and a longitudinal view ultrasound video image 704 of a target scan region for three-dimensional alignment of an exterior device in order to access an interior structure below an exterior target region. Shown in FIG. 7 are the first display area 403, the second display area 404, the vertical midline indicator 405, an interior structure 701 (e.g., a vein), an external device 702 (e.g., a needle), and transverse view 703 and a longitudinal view 704.

We claim:

1. A single ultrasound imaging probe 101 comprising a single ultrasound transducer array 103 comprising a first array segment 201 comprising a K plurality of ultrasound transducer elements 103a capable of emitting a first array segment ultrasound plane 301 from the first array segment 201, wherein the first array segment 201 further comprises a first array segment first end 201a, a first array segment second end 201b and a first array segment midpoint 201c, a second array segment 202 comprising an M plurality of ultrasound transducer elements 103b capable of emitting a second array segment ultrasound plane 302 from the second array segment 202, wherein the second array segment 202 further comprises a second array segment first end 202a and a second array segment second end 202b, an electric connection 105 capable of electrically connecting the first array segment second end 201b to the second array segment first end 202a, wherein the first array segment 201 is orthogonally positioned to the second array segment 202 with the first array segment midpoint 201c adjacent to the second array segment second end 202b to comprise a K plurality of ultrasound transducer elements 103a plus an M plurality of ultrasound transducer elements 103b such that the first array segment ultrasound plane 301 has a midline and is orthogonally and adjacently positioned to a proximal end of the second array segment ultrasound plane 302, and an at least one electronic circuitry for processing ultrasound echo signals 102 capable of controlling the first array segment 201 to transmit, receive, beam form, and focus and is further capable of controlling the second array segment 202 to transmit, receive, beam form, and focus, and wherein the at least one electronics circuitry for processing ultrasound echo signals 102 is further capable of processing a plurality of ultrasound echo signals from the K plurality of ultrasound transducer elements 103a and from the M plurality of ultrasound transducer elements 103b, and is further capable of outputting ultrasound echo signals for a simultaneous display of a scan-converted transverse view ultrasound video image 613 and a scan-converted longitudinal view ultrasound video image 614 in a video display 406.

2. The single ultrasound imaging probe 101 of claim 1 further comprising an exterior housing 118 comprising a light source 116 adjacent to the first array segment midpoint 201*c*, wherein the light source 116 is capable of emitting a visible beam of light 303 coplanar to the second array segment ultrasound plane 302.

3. The single ultrasound imaging probe 101 of claim 2 wherein the light source 116 is a light-emitting diode.

4. The single ultrasound imaging probe 101 of claim 2 wherein the light source 116 is a laser diode.

5. The single ultrasound imaging probe 101 of claim 1 wherein the single ultrasound imaging probe 101 is capable of wired coupling to a scan converter module 407.

6. The single ultrasound imaging probe 101 of claim 1 wherein the single ultrasound imaging probe 101 is capable of wireless coupling to a scan converter module 407.

7. A method for operating a single ultrasound imaging probe 101 comprising acquiring 601 a first plurality of ultrasound echo scan lines 611 from a first array segment ultrasound plane 301 of a first array segment 201 comprising a K plurality of ultrasound transducer elements 103*a* in the first array segment 201 of a single ultrasound transducer array 103, acquiring 602 a second plurality of ultrasound echo scan lines 612 from a second array segment ultrasound plane 302 of a second array segment 202 comprising an M plurality of ultrasound transducer elements 103*b* in the second array segment 202 of the single ultrasound transducer array 103, processing 603 the first plurality of ultrasound echo scan lines 611 from the first array segment 201 with a first computational scan converter 401 to a scan-converted transverse view ultrasound video image 613, outputting 604 the scan-converted transverse view ultrasound video image 613 to a first display area 403 of a video display 406, processing 605 the second plurality of ultrasound echo scan lines 612 from the second array segment 202 with a second computational scan converter 402 to a scan-converted longitudinal view ultrasound video image 614, outputting 606 the scan-converted longitudinal view ultrasound video image 614 to a second display area 404 of the video display 406, displaying 607 a transverse view ultrasound video image 615 from the first computational scan converter 401 onto a first display area 403 of a video display 406, displaying 608 a longitudinal view ultrasound video image 616 from the second computational scan converter 402 onto a second display area 404 of the video display 406, and displaying 609 a vertical midline indicator 405 superimposed on the transverse view ultrasound video image 615 in the first display area 403 of the video display 406.

8. The method for operating an ultrasound imaging probe 101 of claim 7 further comprising projecting 608 a visible beam of light 303 from a light source 116 wherein the visible beam of light 303 is co-planar to the second array segment ultrasound plane 302.

* * * * *